(12) United States Patent
Daemen

(10) Patent No.: US 6,375,895 B1
(45) Date of Patent: Apr. 23, 2002

(54) HARDFACING ALLOY, METHODS, AND PRODUCTS

(75) Inventor: Roger Auguste Daemen, Grignan (FR)

(73) Assignee: ATT Technology, Ltd., Houston, TX (US)

( * ) Notice: Subject to any disclaimer, the term of this patent is extended or adjusted under 35 U.S.C. 154(b) by 0 days.

(21) Appl. No.: 09/594,531

(22) Filed: Jun. 14, 2000

(51) Int. Cl.[7] .............................. C21D 9/14; C22C 38/22
(52) U.S. Cl. ........................ 420/105; 420/67; 420/99; 148/519; 148/520; 148/521; 148/529; 428/684; 285/333
(58) Field of Search ................... 420/67, 105, 99; 148/519–521, 325, 334, 529; 285/333; 428/684

(56) References Cited

U.S. PATENT DOCUMENTS

| | | | | |
|---|---|---|---|---|
| 2,259,232 A | * | 10/1941 | Stone | |
| 2,262,211 A | * | 11/1941 | Stone | |
| 3,067,593 A | * | 12/1962 | McCool | |
| 3,901,690 A | * | 8/1975 | Philip et al. | 420/99 |
| 3,989,554 A | * | 11/1976 | Wisler | 285/333 |
| 4,256,518 A | * | 3/1981 | Bolton et al. | 148/127 |
| 4,431,902 A | * | 2/1984 | Wallen | 219/125.12 |
| 4,942,059 A | * | 7/1990 | Wilson | 427/53.1 |
| 5,244,559 A | * | 9/1993 | Latz | 204/298.09 |

* cited by examiner

Primary Examiner—Deborah Yee
(74) Attorney, Agent, or Firm—James F. Weiler

(57) ABSTRACT

Disclosed is a hardfacing alloy capable of withstanding abrasion of the order of silicious earth particles and weldable in crack free state on industrial products, such as tool joints and stabilizers used in oil and gas well drilling, and other industrial products. The hardfacing alloy has a low coefficient of friction, high abrasion resistance as welded without working, and in tool joints and stabilizers achieves an optimum balance between tool joint and stabilizer wear resistance and induced casing wear. Other embodiments of the invention include tool joints having the hardbanding alloy welded to the outer cylindrical surface to its box and pin members and to stabilizer ribs on the stabilizer used in earth boring, such as boring for oil and gas, other industrial products, methods of producing the hardfacing alloy, and methods of applying the hardfacing alloy to surfaces including preheat and post-welding conditions to withstand abrasive use.

12 Claims, 8 Drawing Sheets

HARDFACING ALLOY, METHODS, AND PRODUCTS

FIELD OF THE INVENTION

The present invention is in the field of hardfacing alloys having high abrasion resistance for improving the service life of surfaces of industrial products subject to wear such as tool joints, drill collars, and stabilizers used in drilling strings for earth boring for oil and gas as well as other industrial products subjected to high abrasion.

BACKGROUND OF THE INVENTION

There has been a severe problem with the service life of tool joints and stabilizers used in earth boring such as drilling a bore hole in the earth to a formation or formations from which oil or gas are to be produced since approximately 95 percent of the surface of the earth is composed of silicious materials which are very abrasive and which cause considerable wear on the surfaces of tool joints and stabilizers, as well as wear prone surfaces of other industrial products.

There have been numerous attempts to provide hardfacing alloys suitable for welding protective hardfacing (referred to as "hardbanding") on tool joints. For a description of prior art hardbanding for tool joints, reference is made to U.S. Pat. No. 4,256,518, the composite catalog of oil field equipment and services, 1976/77 edition, at pages 3216–19 and pages 4994–5; U.S. Pat. No. 3,067,593. Also, for the use of hardbanding materials, such as tungsten carbide particles to form a hardened surface at a tool joint to increase wear resistance, reference is made to U.S. Pat. No. 3,989,554 issued Nov. 2, 1976 and the history of oil well drilling by J. E. Brantly published in 1971 by the book division of Gulf Publishing Company, Houston, Tex. Also, reference is made to U.S. Pat. Nos. 2,259,232; 2,262,211; 4,431,902; and 4,942,059 which illustrate various prior art ways to hardband tool joints.

Historically, and in practice, tool joints on drilling strings (pipe) such as used in drilling oil and gas wells have been faced at the bottom of the box end with tungsten carbide to resist the abrasion of the rock earth in the drill hole on the tool joint. This has three disadvantages. Tungsten carbide is expensive, it acts as a cutting tool to cut the well casing in which it runs, and the matrix is a soft steel which erodes away easily to allow the carbide particles to fall away.

Most prior art hardfacing materials harder than silicious earth materials are brittle and crack. These hardfacing materials are alloys which belong to a well-known group of "high Cr-irons" and their high abrasive resistance is derived from the presence in the microstructure of the Cr-carbides of the eutectic and/or hypereutectic type. In the as-welded condition, whatever the precautions taken, these hardfacing overlays always show a more or less dense network of cracks. Preheat of the base material being hardfaced is not a prerequisite. On the contrary, the lower the preheat and interpass temperatures, the denser the network of cracks, which can be considered as a favorable factor from the point of view of the risk of crack propagation into the base material under service conditions.

In the 50 year history of hardbanding tool joints or stabilizers of drilling pipe, no facing which cracked during application has been used in practice prior to the development of the invention in U.S. Pat. No. 5,244,559.

In most industries, however, the metal components which make up the structure and equipment of a given plant must have integrity, which means being free of any kind of cracks since these might be expected to progress through the piece and destroy the part.

When the loss of human life may be involved or when great property damage may result, the requirements for integrity are particularly strict. Examples of such industrial products are pressure vessels in the process industries, structural members in buildings and bridges, and down hole drilling equipment in the oil and gas industry.

Silicious earth particles have a hardness of about 800 Brinell hardness number (BHN). In U.S. Pat. No. 5,244,559 the hardfacing material used is of the group of high Cr-irons that contains primary carbides which have a hardness of about 1700 BHN in a matrix of a hardness of at least 300 BHN to 600 BHN. These primary carbides at this high hardness have little tensile strength and hence pull apart on cooling from molten state at a frequency that depends on the relative quantity of the primary carbides in the mix of metal and carbide. Thus, this type of hardfacing material, which is harder than silicious earth materials, when applied by welding or with bulk welding form shrinkage cracks across the weld bead. This material has been applied extensively and successfully during many years for the hardbanding of tool joints and hardfacing of other industrial products. Although the material has become and still is widely accepted by the trade, some users have expressed a desire for hardbanding tool joints alloy combining the property of including the minimum possible amount of wear in drill casing with the capability of being welded crack free in order to minimize any concerns of mechanical failure risks.

It would be highly desirable and advantageous to provide a hardfacing alloy composition having a microstructure of high abrasive resistance capable of being weld deposited without cracks that does not need to workharden to achieve the hardness properties to withstand the conditions of use, such as abrasion by silicious particles, and which, in addition, has a low coefficient of friction to minimize casing wear by hardbanded tool joints and stabilizers.

SUMMARY OF THE INVENTION

The present invention is directed to such a hardfacing alloy composition and industrial products, such as tool joints and stabilizers hardbanded with the alloy composition and other industrial products hardfaced with the alloy composition, which results in a microstructure in the alloy characterized by a high abrasion resistance to withstand the conditions of use, such as abrasive wear by silicious rock formations and particles and which has a low coefficient of friction that confers an excellent metal to metal wear resistance and which confers minimum casing wear, and the capability of being welded crack free when using appropriate preheat and post cooling conditions, as hereinafter set forth.

The hardfacing alloy of the present invention is particularly suited for welding on wear prone surfaces of tool joints and stabilizers (hardbanding) where it provides great protection from abrasion while remaining in a crack free state. The hardfacing alloy of the present invention has a low coefficient of friction, which provides an excellent metal to metal wear resistance and excellent abrasion resistance, and in the case of hardbanded joints has an optimum balance between the minimizing of induced casing wear and the maximizing of tool joint resistance, for example, about 40 percent less casing wear than the hardfacing alloy of U.S. Pat. No. 5,244,559.

The hardfacing alloy can be welded to a surface using the following products and processes, under various types of gas, such as $CO_2$, and Argon based mixtures, self shielded (open arc) tubular wire and submerged-arc tubular wire.

The hardfacing alloy has an all weld metal composition undiluted by base metal by weight of about 0.65 to about 1.1 percent carbon, about 4.5 to about 10.5 percent chromium, about 0.05 to about 1.0 percent molybdenum, about 0.65 to about 1.5 percent manganese, and the remainder iron including impurities as trace elements. The hardfacing alloy in undiluted and as-welded condition has a hardness of from about 48 Rc (455 BHN) to 52 Rc (512 BHN). Its hardness, when welded in a single layer on a typical high carbon tool joint steel, reaches about 55 Rc (560 BHN). It is further characterized by high abrasion resistance against silicious rock formations and particles, a low coefficient of friction resulting in excellent metal to metal use or resistance and very significant reduction in induced casing wear, and a microstructure consisting of Martensite with about 10 to 40 percent Austenite. It is capable of being welded crack-free in single and double layers, when using preheat and post-welding cooling down conditions, as subsequently set forth. It can be deposited over preexistent weld deposits, such as tungsten carbide deposits and many other previous hardfacing and hardbanding deposits.

Embodiments of the invention include the hardfacing alloy composition, tool joints, and stabilizers hardbanded by the hardfacing alloy composition. For example, tool joints which connect together drill pipe have an internally threaded box for reception of a threaded pin member, a cylindrical outer surface and a layer of the hardbanding alloy composition welded on the cylindrical outer surface, and on its pin member, if desired, which provides tool joint protection from silicious abrasions while remaining in the crack free state. Also, stabilizers connected to drill pipe having stabilizer ribs hardbanded with the hardfacing composition which stabilize the drill pipe in the well bore and casing.

The method of the invention comprises applying the hardfacing alloy to industrial products, such as hardbanding tool joints and stabilizers by welding, by tubular wire open arc, gas shielded or submerged arc as previously set forth, and under preheat and post-welding cooling down conditions as subsequently set forth.

Other embodiments of the invention are industrial products having surfaces requiring high abrasion resistance hardfaced with the composition of the invention welded to their wear prone surface, such as abrasion resistance plates and other industrial structures requiring abrasion resistance, as previously set forth.

Advantageously, the hardbanding alloy can be deposited in crack-free state in single and double layers and on top of other preexisting hardfacing alloys, such as tungsten carbide using the preheat and post-weld thermal conditions as set forth herein.

Accordingly, it is an object of the present invention to provide a crack free hardfacing alloy for industrial uses in which the hardfacing alloy is capable of withstanding silicious abrasion, such as having a hardness of from about 48 Rc (455 BHN) to about 52 Rc (512 BHN), as welded and without workhardening.

It is yet a further object of the present invention to provide such a crack free hardfacing alloy, which can be utilized to hardband and thereby improve the service life of tool joints connecting drill pipe rotated and moved in casing in earth boring, and which remains in a crack free state.

A further object of the present invention is to provide a crack free hardfacing alloy, which can be utilized to hardband stabilizers which as welded withstands abrasion by silicious formations of the earth and other silicious materials.

A further object of the present invention is to provide other industrial products subject to such abrasion having the hardfacing alloy welded on surfaces subject to such abrasion.

It is a further object of the present invention to provide such a hardfacing alloy for industrial products which have this abrasive resistant alloy welded on their abrasive prone surfaces, which has a low coefficient of friction, excellent abrasion resistance, which in the case of tool joints and stabilizers achieve an optimum balance between the minimizations of induced casing wear in the bore hole, the maximization of tool joint wear resistance, and about 40 percent less casing wear than the hardfacing alloy of U.S. Pat. No. 5,244,559.

Other and further objects, features, and advantages of embodiments of the invention appear throughout.

DESCRIPTION OF PRESENTLY PREFERRED EMBODIMENTS

The hardfacing composition of the present invention comprises by weight from about 0.65 to about 1.1 percent carbon, about 4.5 to about 10.5 percent chromium, about 0.5 to about 1.0 percent molybdenum, about 0.65 to about 1.5 percent manganese, and the balance iron with impurities as trace elements.

The hardfacing alloy composition of the present invention has an all weld hardness of from about 48 Rc (455 BHN) to 52 Rc (512 BHN), an average hardness single layer on industrial products, such as tool joints and drill stabilizers of about 560 BHN, a microstructure of Martensite with from about 10 percent to 40 percent Austenite, high abrasion resistance, a low metal to metal coefficient of friction, and is capable of being deposited crack free in single and double layers on top of itself or on pre-existent hardband alloys, such as tungsten carbide deposits.

Figure 6:
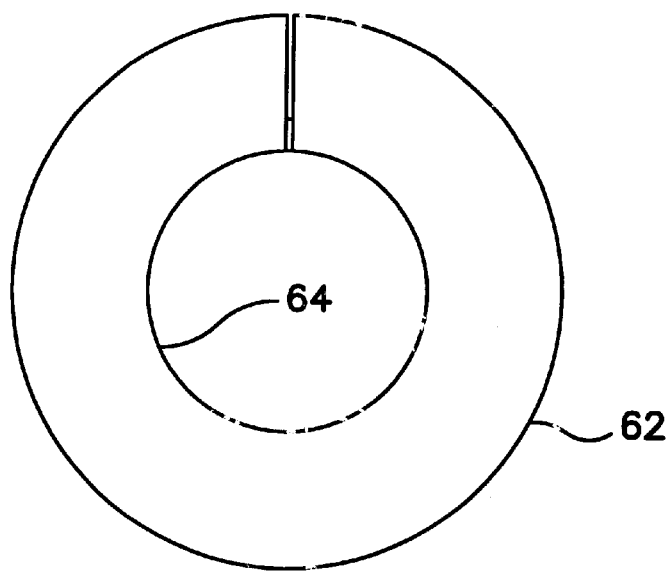
FIG. 6 is a cross-sectional view of a cored wire with a butt seam joint.
Figure 7:
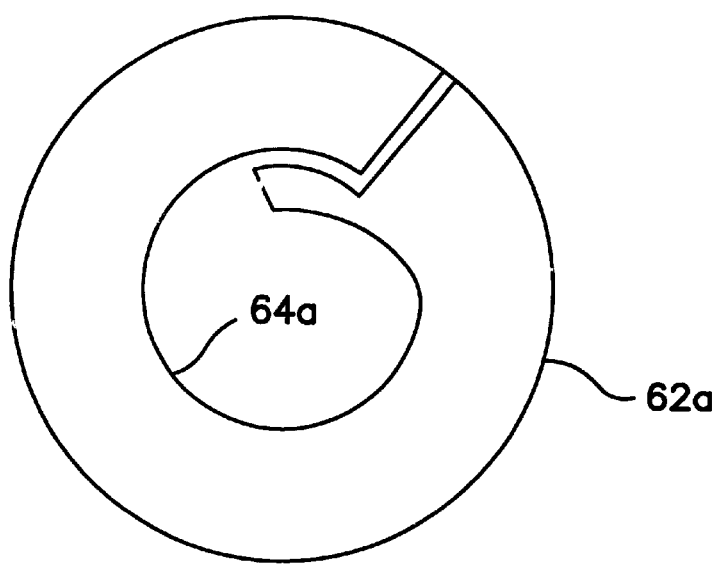
FIG. 7 is a cross-sectional view of a cored wire with an overlap seam joint.
Figure 8:
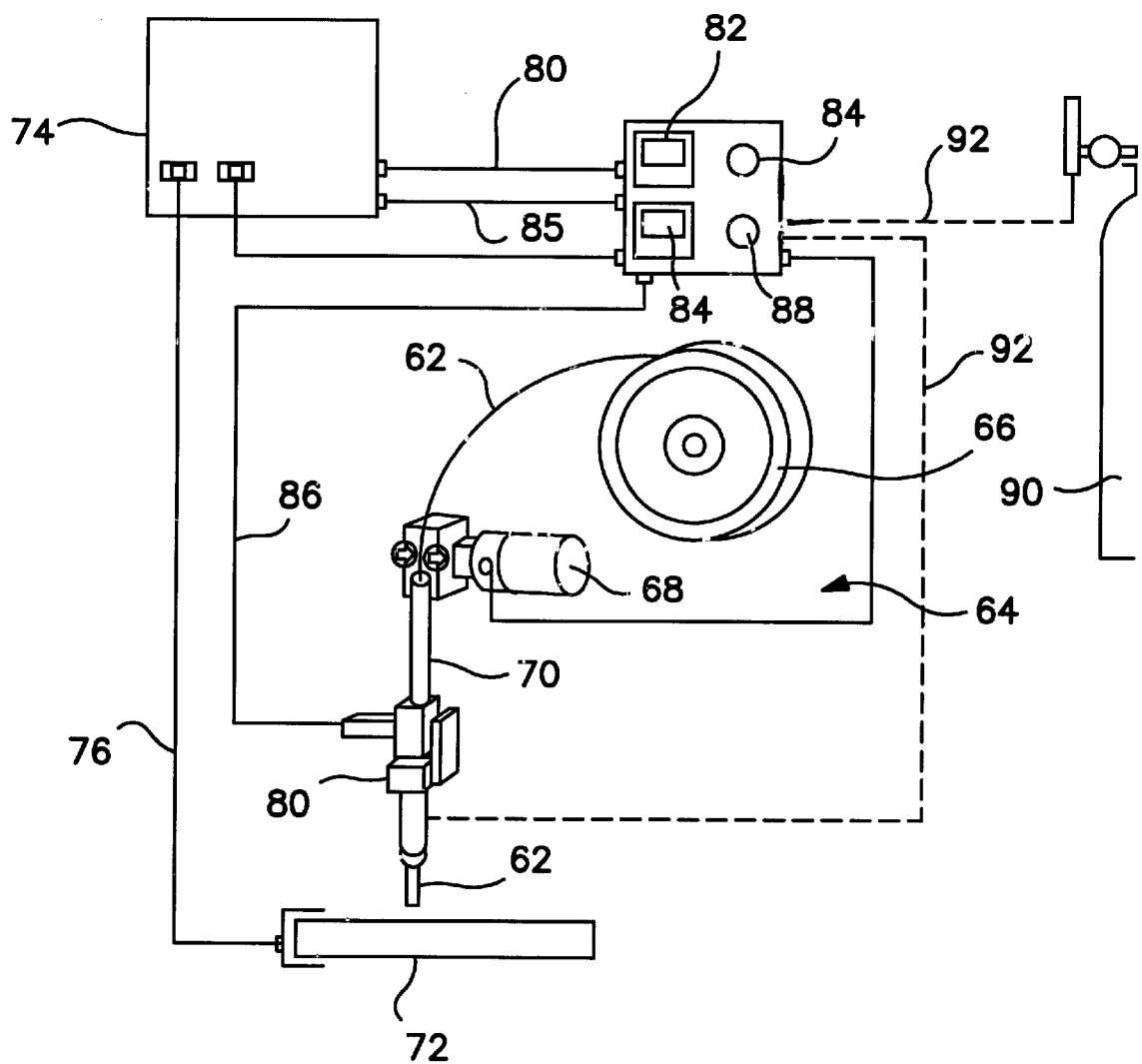
FIG. 8 is a diagrammatic view of apparatus suitable for welding a cored wire of the hardfacing alloy in open, gas shielded or submerged arc.

The hardfacing alloy composition can be deposited by any suitable welding means and methods compatible with preheat and cooling down treatments, such as open arc, gas or flux shielded. Preferably, a metal cored tubular wire used under gas shielding, such as $CO_2$ especially for tool joints and stabilizers, and a flux cored tubular wire without gas shielding for hardbanding the surfaces of stabilizers as illustrated in FIGS. 6 and 7 as subsequently described. Other industrial applications include earthmoving and dredging equipment and components such as bucket teeth, gravel pump parts, crusher hammers, conveyor chains, gear teeth, and metal to metal sliding parts in the industry.

The chemical analysis of a preferred alloy composition of the invention is set forth in the following table 1.

TABLE 1

| Sample | |
|---|---|
| Carbon | 0.8% |
| Chromium | 8.5% |
| Molybdenum | 0.15% |
| Manganese | 1.1% |
| Silicon | 0.6% |
| Remainder Iron (including trace elements as containments) | |

The hardfacing alloy set forth in Table 1 as welded to hardband tool joints, stabilizers, or hardfacing surfaces of other industrial products is free of cracks, and has a typical hardness as deposited of about 48 Rc (455 BHN) to about 52 Rc (512 BHN) as welded on a surface without work hardening.

The following embodiment of the present invention is a tool joint hardbanded with the crack free hardfacing alloy of the present invention.

Figure 1:
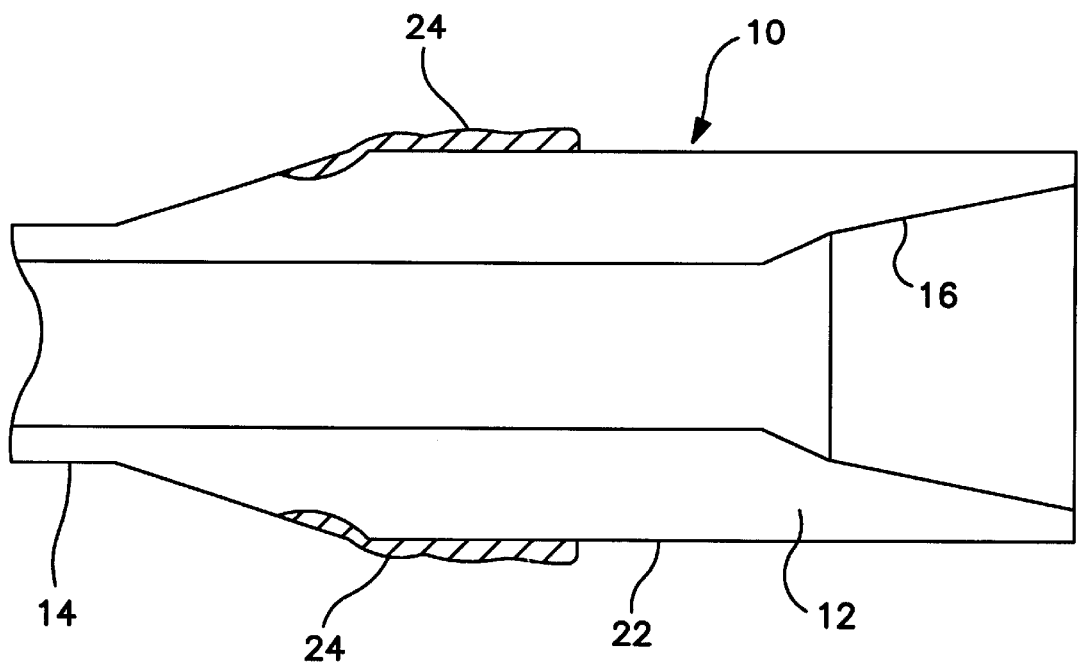
FIG. 1 is a fragmentary longitudinal sectional view of a box of a tool joint with a raised hardband according to the invention.
Figure 2:
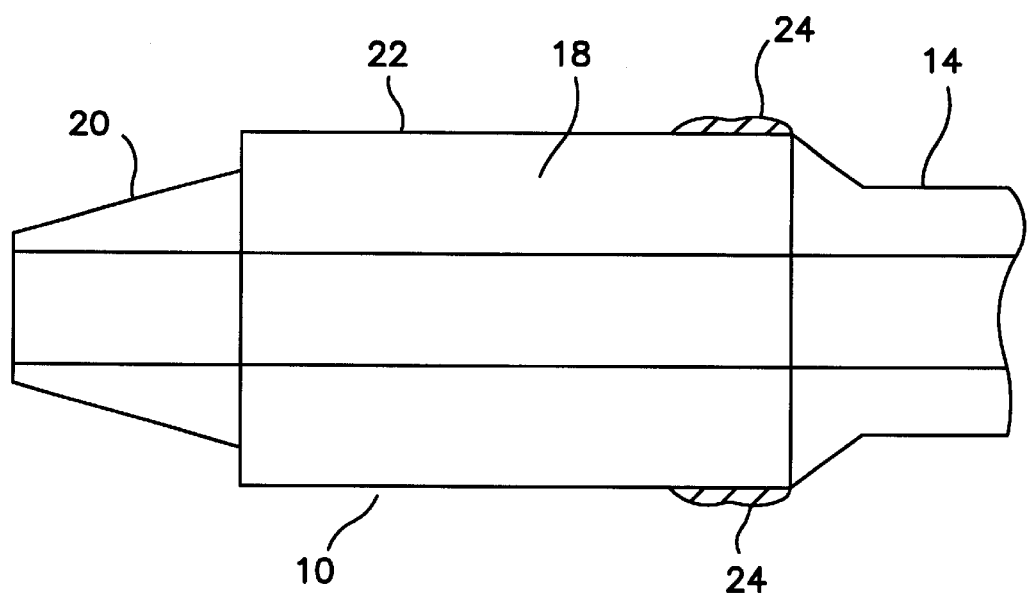
FIG. 2 is a view similar to FIG. 1 illustrating a pin of the tool joint with a raised hardband according to the invention.

Referring now to FIGS. 1 and 2, a tool joint for drill pipe 10 is illustrated which has a box 12 at the end of the drilling pipe 14 which is internally threaded at 16 which threadedly receives a pin 18 having coacting threads 20 to the threads 16 so that the pin 18 can be threaded into box 12. The pin 18 forms the end of a drill pipe, such as 14, so that a string or joints of pipe can be threadedly secured together and disconnected for drilling oil, gas, and other wells.

The box 12 and the pine 18 are enlarged and have a outer cylindrical surfaces 22 having an outer diameter greater than the outer diameter of the drill pipe 14 for deposit of the beads 24 of the hardbanding alloy.

Figure 3:
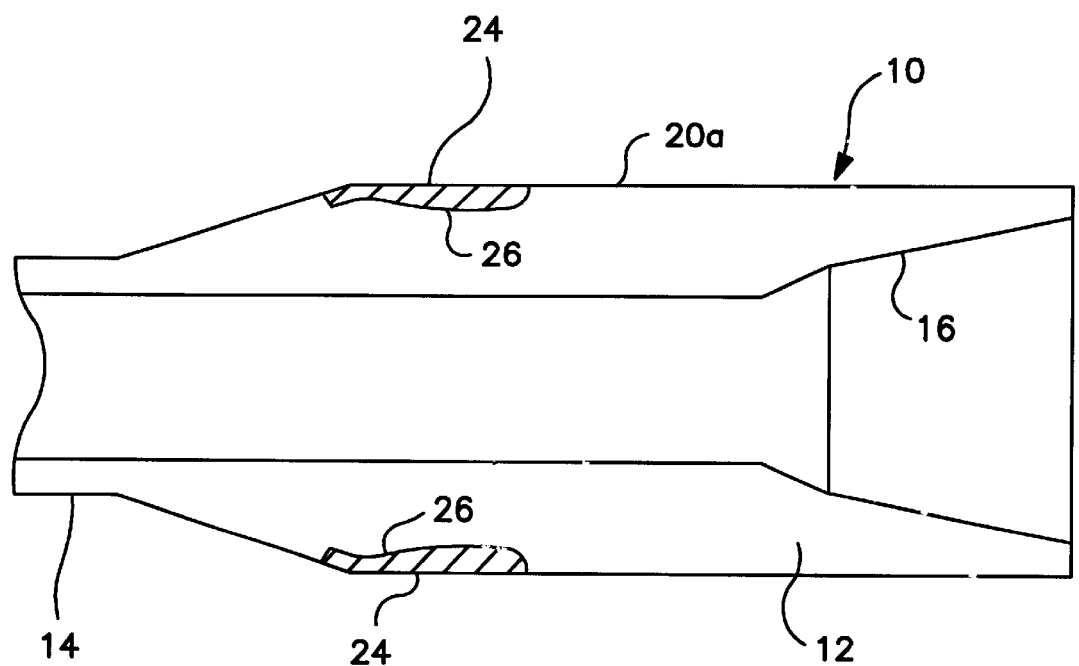
FIG. 3 is a view similar to FIG. 1 illustrating flush hardbanding of a box of the tool joint according to the invention.
Figure 4:
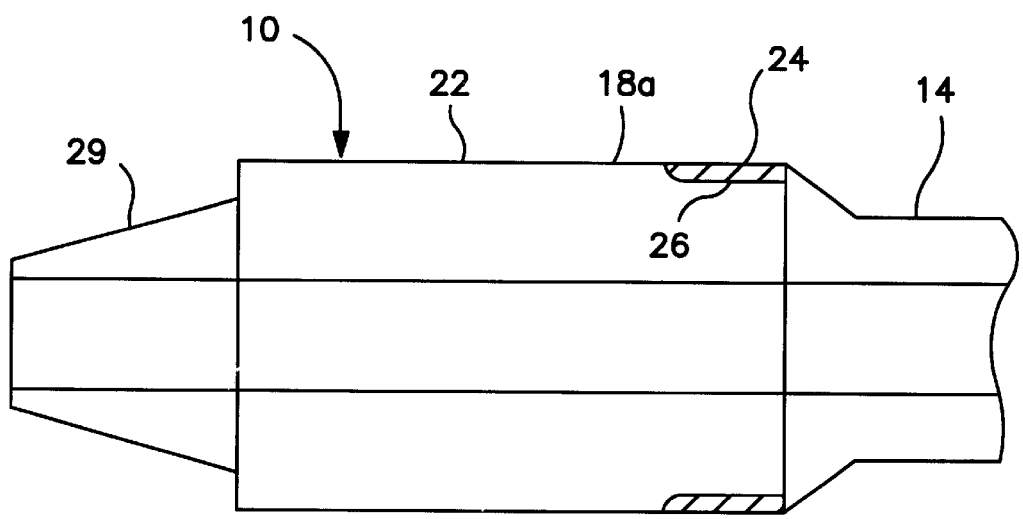
FIG. 4 is a view similar to FIG. 1 illustrating flush hardbanding of a pin of the tool joint according to the invention.

Referring now to FIGS. 3 and 4 where the reference letter "a" has been added to reference numerals corresponding to those in FIGS. 1 and 2, the tool joint 10a of FIGS. 3 and 4 is identical to that of the tool joint 10 of FIGS. 1 and 2 except that it has a reduced cylindrical portion 26 formed by either the removal of a circumferential band of material from the outer cylindrical surfaces 22a of the box 12a and the pine 18a or was originally formed with these reduced diameter sections 22a, and the hardbanding alloy in beads 24a is welded in this space so that the surface of the weld deposited hardfacing is substantially flush with the outer cylindrical surface of the box 12a and the pin 18a.

Figure 5:
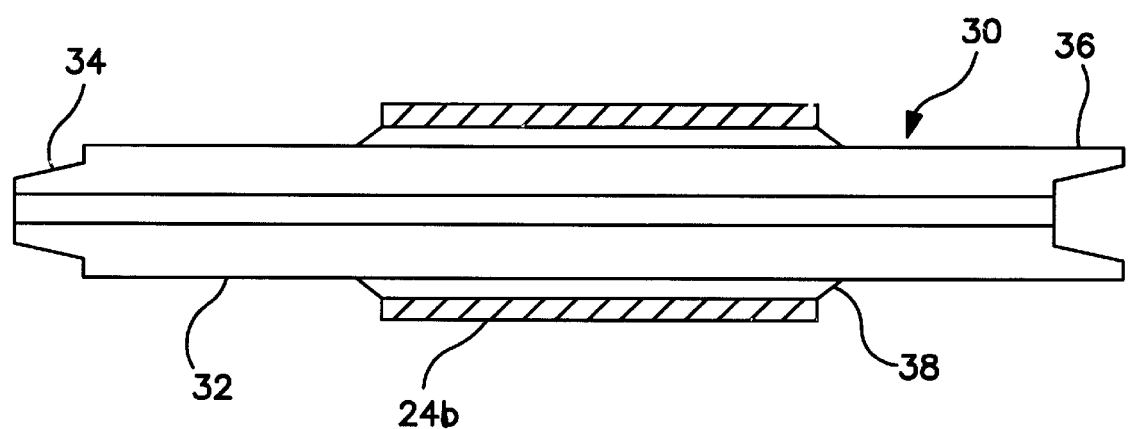
FIG. 5 is a longitudinal view of a stabilizer hardbanded according to the invention.

Referring to FIG. 5, a stabilizer 30 according to the invention is illustrated which has an elongated cylindrical or pipe-like body 32 having the pin 34 and box 36 for connection in a string of drill pipe (not shown), the stabilizer having the stabilizer ribs 38 extending outwardly from the body 32 for stabilizing the drill pipe in a well bore (not shown) to which the stabilizer ribs 38 the hardbanding alloy 24b is welded.

The method of the invention for prolonging the surface life of tool joints, stabilizers, and other industrial products comprises preheating them to a temperature of about 100° C. (212° F.) to about 400° C. (752° F.) and then hardfacing or hardbanding by tubular wire, in open arc, gas shielded or submerged arc, a layer of the hardbanding alloy of the present invention 24, 24a, or 24b to the outer cylindrical surface 22 or 22a of the box 12 or 12a of the tool joints 10 and 10a (FIGS. 1, 2), the outer cylindrical surface 22 of the pin 18 (FIGS. 3 and 4) and the stabilizer ribs 38 (FIG. 5), and then cooling them slowly to insure structural transformation of Austenite to Martensite. Normally, the weld beads 24 of the hardbanding alloy are about $\frac{3}{32}$ to $\frac{1}{4}$ inch thick without detriment to the alloy properties and can be deposited in single or double layers. If desired, the surfaces 22a of the weld beads 24 can be substantially flush with the surface of the box 12a, and about $\frac{3}{32}$ inch of material is removed.

The preheating temperature level is determined by the size of the components to be hard surfaced, as well as the nature of the base metal involved. In general terms, the larger the size and the higher the strength of the base metal, the higher the level of preheat required. Preheating can be carried out by any means capable of ensuring a uniform and thorough thickness distribution of temperatures. The use of gas burners is the present most widespread method and induction heating is also used. The control of the preheat temperature is carried out by means of pyrometric techniques such as thermo-crayons (least sophisticated method), contact thermocouples, or even infrared noncontact devices (most sophisticated method). Induction heating is a more elaborate and expensive applicable method. The control of cooling down is achieved in a very simple way, by wrapping of the hard surfaced component in a thermal insulating blanket or placing it in a canister. Examples of preheating temperature ranges for various sizes and base materials are set forth in the following Examples 1, 2, and 3.

EXAMPLE 1

Preheating temperatures typically range form 100 to 400° C.

For hardbanding AISI (American Iron and Steel Institute) 4137 steel tool joints, the preferred preheat temperature range is set forth in the following Table 2

TABLE 2

| Tool Joint O.D. | Preheat Temperature |
|---|---|
| 3⅛" to 4⅜" | 150° F. to 200° F. (66° C. to 93° C.) |
| 4¾" to 5¼" | 200° F. to 250° F. (93° C. to 121° C.) |
| 5½" to 6¼" | 300° F. to 350° F. (149° C. to 177° C.) |
| 6½" to 6¾" | 350° F. to 400° F. (177° C. to 204° C.) |
| 7" to 7¼" | 400° F. to 450° F. (204° C. to 232° C.) |
| 7½" to 7¾" | 450° F. to 500° F. (232° C. to 260° C.) |
| 8" to 8½" (nom.) | 600° F. to 700° F. (316° C. to 371° C.) |
| 8" to 8½" (w/5" id.)* | 500° F. to 600° F. (260° C. to 316° C.) |

*The wall thickness of this size tool joint is much less than normal tool joints.

EXAMPLE 2

For hardbanding AISI 4145-HT steel tool joints, the preferred preheat temperature range is set forth in the following Table 3.

TABLE 3

| Tool Joint/Drill Collar O.D. | Preheat Temperature |
| --- | --- |
| Less than 4¾" | 150° F. to 200° F. (66° C. to 93° C.) |
| 4¾" to 6⅛" | 200° F. to 300° F. (93° C. to 149° C.) |
| 6¼" to 7¼" | 300° F. to 400° F. (149° C. to 204° C.) |
| 7½" to 7¾" | 450° F. to 500° F. (232° C. to 260° C.) |
| 8" to 8½" (nom.) | 600° F. to 700° F. (316° C. to 371° C.) |
| 8" to 8½" (w/5" id.)* | 500° F. to 600° F. (260° C. to 316° C.) |

*The wall thickness of this size tool joint is much less than normal tool joints.

EXAMPLE 3

For hardbanding AISI 1340-HT steel tool joints, the preferred preheat temperature range is set forth in the following Table 4.

TABLE 4

| Tool Joint O.D. | Preheat Temperature |
| --- | --- |
| Less than 4¾" | 150° F. to 200° F. (66° C. to 93° C.) |
| 4¾" to 6⅛" | 200° F. to 300° F. (93° C. to 149° C.) |
| 6¼" to 7¼" | 300° F. to 400° F. (149° C. to 204° C.) |
| 7½" to 7¾" | 450° F. to 500° F. (232° C. to 260° C.) |
| 8" to 8½" (nom.) | 600° F. to 700° F. (316° C. to 371° C.) |
| 8" to 8½" (w/5" id.)* | 500° F. to 600° F. (260° C. to 316° C.) |

*The wall thickness of this size tool joint is much less than normal tool joints.

The foregoing examples are representative of preheat temperatures for the applications set forth and serve as examples for other preheat temperatures depending on the size of the components to be hardfaced and the nature of the base material which can be determined by simple experimentation.

It is preferable that the preheat temperature be measured with a contact electronic pyrometer, although other temperature measuring means may be employed, such as two tempstiks (thermal crayons), all of which are readily available on the open market.

Figure 9:
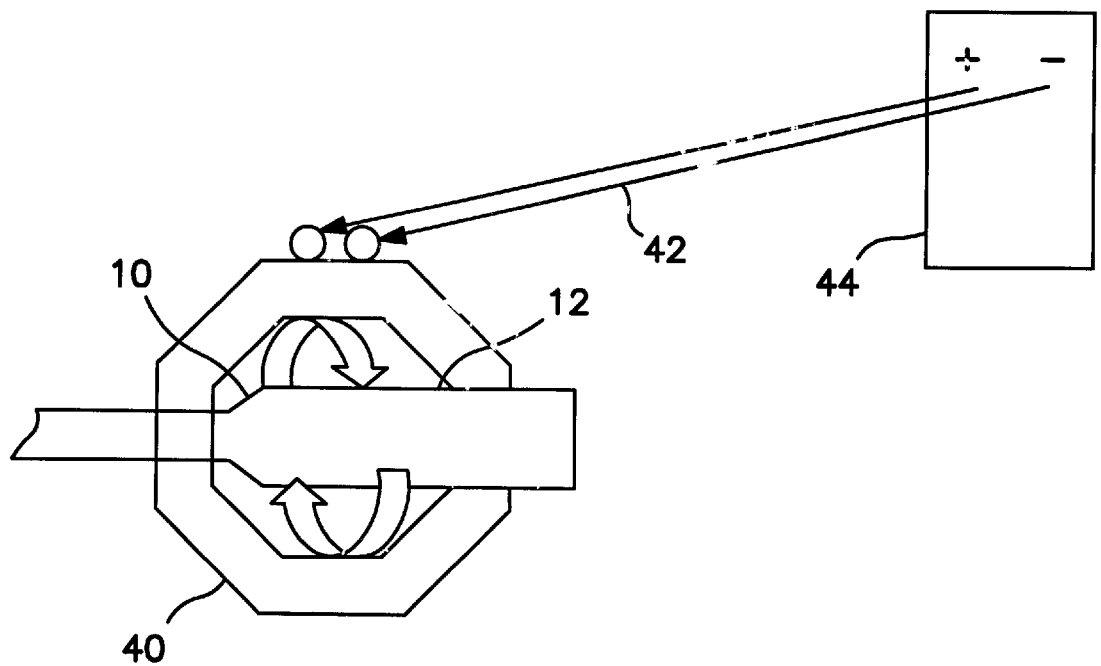
FIG. 9 is a diagrammatic view of a preheating system illustrating an electromagnetic induction coil for preheating the pin, box, and stabilizer for welding.

Referring now to FIG. 9, a means useful in the preheating system is an electromagnetic induction coil 40 into which the box 12 or 12a and pin 18 or 18a of the tool joint 10 of the drill pipe 14 or the stabilizer 30 are placed receiving electrical energy or power through the lines 42 from the electrical power source 44. These electromagnetic indication coils are readily available on the open market, and no more description thereof is deemed necessary or given.

Figure 10:
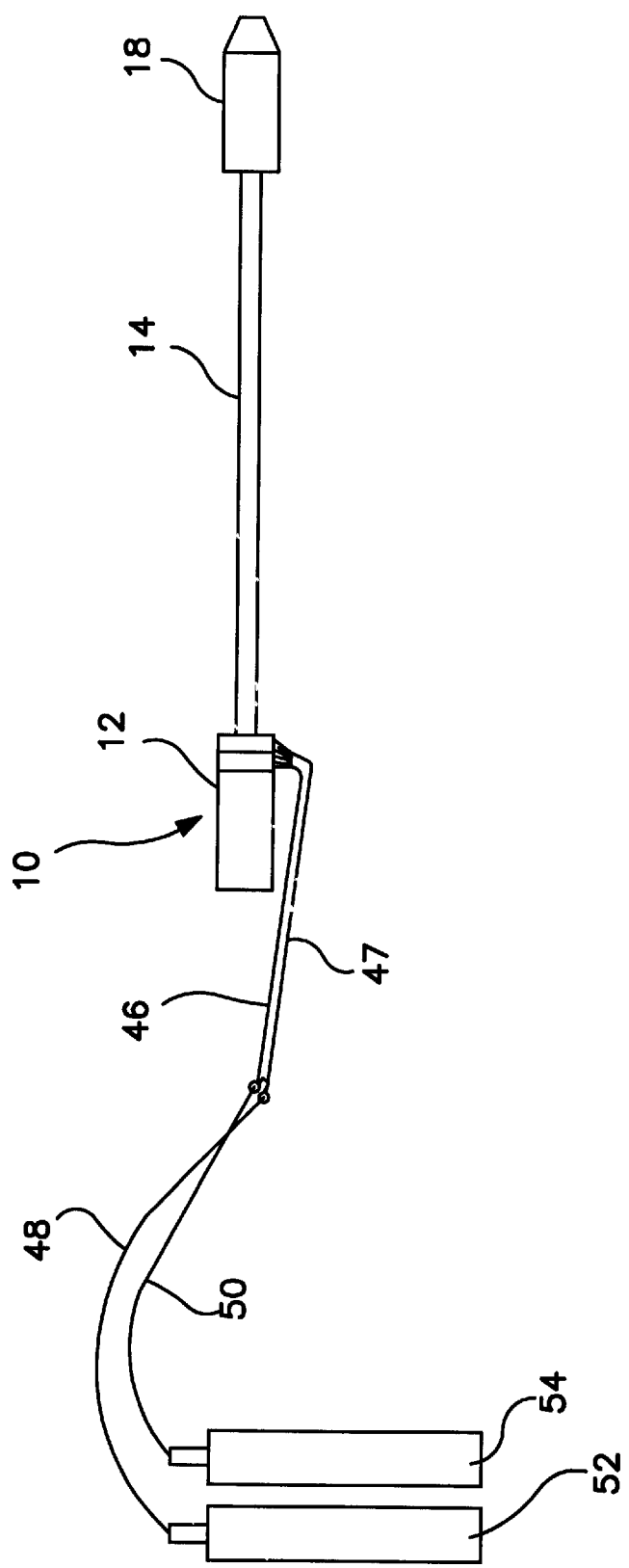
FIG. 10 is a diagrammatic view of a gas torch for preheating the pin, box, and stabilizer.

Referring now to FIG. 10, a gas torch 46 for the preheating system is illustrated which includes a torch wand 47 supplied oxygen and propane through the lines 48 and 50 from the oxygen gas bottle 52 and propane bottle 54. The torch 46 is hand held and the flames 56 from the torch wand 47 preheat the box or pin or stabilizer to be welded, here shown as the box 12 of the tool joint 10 connected to the drill pipe 14.

The cooling conditions after welding the layer of hardfacing to the weld surface should be slow enough to ensure the optimal rate of structural transformation from Austenite to Martensite. Such a slow rate of cooling is achieved by wrapping the surface of the alloy weld with an insulating blanket immediately after completion of welding and permitting further cooling in still air to ambient temperature. Such a thermal blanket is an off-shelf item and commercially available on the market, such as Welding Products of Texas, United Welding Supplies, and William Alloy Welding Equipment, Inc., all of Houston, Tex., U.S.A.

Figure 11:
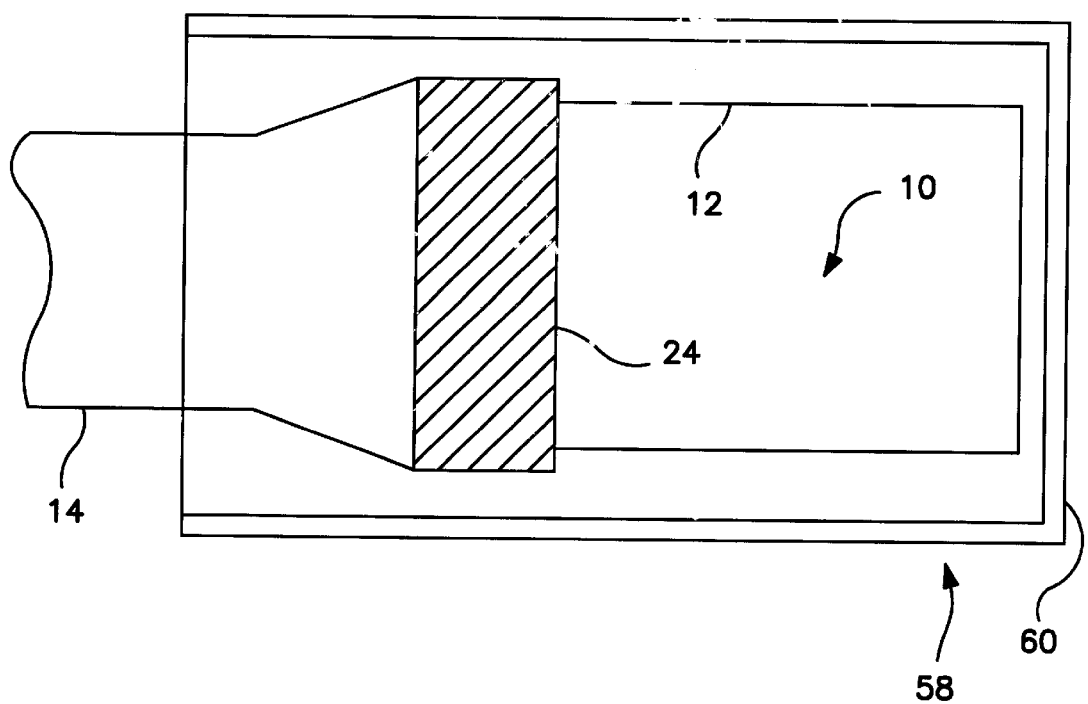
FIG. 11 is a cross-sectional view of a canister shown with a preheated box and welded box useful in cooling down the box after preheated and welded.

Another preferred means for a slow rate of cooling is the use of a canister illustrated in FIG. 11 to which reference is now made. A cylindrical canister 58 having a closed end 60 of a size so that the welded box 12 of the tool joint 12 can be inserted. The closed end 60 prevents flow of air through the drill pipe 14 and insures that a slow cool down in still air takes place. While not shown, the preheated and welded pin member 20 of the tool joint 10 can be cooled down in the same way. The canister 58 is formed of mild steel. The canisters 58 are readily available on the open market, and no further description thereof is given or deemed necessary.

Referring now to FIG. 6, a tubular butt seam wire 62 having a core 64 of the weldable alloy composition is illustrated. In FIG. 5, a tubular overlap joint seam wire 40a having the core 62a is illustrated. In both cored tubular wires 62 and 62a, the cores 62 and 62a can be completely metallic powders, called metal cored, or a mixture of metal and mineral powders, called flux cored. In each case, the cored powders with the iron wire make up the alloy composition of the hardfacing or hardbanding alloy of the present invention. Since cored wires are well known in the art and trade, no further description is given thereof or deemed necessary.

After long periods in service where abrasion by earth materials or silicious or other materials may abrade away an area of the hardfacing, additional hardbanding may be applied as indicated above without essential damage to the box 12 or pin 20 of the tool joint 10 and on the stabilizer ribs 38 of the stabilizer 30.

Referring now to FIG. 6 schematically illustrating apparatus useful in the method of the invention, the apparatus 64 includes a reel 66, a cored wire 62 (or 62a) wound around it, driven by the wire drive motor 68 through the guide tube 70 to the industrial product 72 to be hardfaced or hardbanded. A direct current, constant voltage power source 74 provides electrical energy through the electrical power cable 76 to the industrial product 72, and by the electric power cable 80 to the volt meter 82 and the voltage control 84. The electric cable 85 provides a voltage supply to the voltmeter and then through the electrode power cable 86 to the guide tube 70 and to the cored wire 62 or 62a.

When desired to be used, gas shielding is illustrated diagrammatically by the gas shielding source 90 through the gas tube 92 to the control switch 98 and to the guide tube 99 to provide shielding for electrodes requiring it.

No more description is given or deemed necessary of apparatus for welding the alloy compositions of the wire 52 to a surface to be hardfaced or hardbanded, as such apparatus is well know to those skilled in the art.

While the present invention is particularly suited for hardbanding tool joints and stabilizers, it may be applied to any surface requiring hardbanding or facing, such as structural members, process components, abrasion resistant plates, and the like.

The present invention, therefore, is well suited and adapted to attain the objects and ends and has the advantages and features mentioned as well as others inherent therein.

While presently preferred embodiments of the invention have been given for the purposes of disclosure, changes may be made within the spirit of the invention as defined by the scope of the appended claims.

What is claimed is:

1. A hardfacing alloy for welding to a surface to be abrasion resistant consisting of by weight, about 0.65 to about 1.1 percent carbon, about 4.5 to about 10.5 percent chromium, about 0.05 to about 1.0 percent molybdenum, and the balance iron, including impurities as trace elements, the alloy having a hardness of from about 48 Rc (455 BHN) to about 52 Rc (512 BHN).

2. An industrial product having a surface subject to abrasion comprising, a layer of the hardbanding alloy of claim 1 welded to the surface of the industrial product subject to such abrasion.

3. A tool joint for connecting together drill pipe, the tool joint having a cylindrical body, an internally threaded box which has an outer cylindrical surface of a diameter greater than the drill pipe, and an externally threaded pin including, at least one layer of the hardfacing alloy of claim 1 welded to the outer cylindrical surface of one or both of the box or pin, thereby providing surface resistance to abrasion by silicious materials.

4. The tool joint of claim 3 where, the outer cylindrical surface of one or both the box or pin has a reduced diameter portion extending along a substantial portion of its length, and the layer of hardfacing alloy is welded to the reduced diameter portion of one or both the box or the pin.

5. The industrial product of claim 2 comprising, a stabilizer having a cylindrical body and an internally threaded box and an externally threaded pin for connection in a string of drill pipe, stabilizer ribs having outer surfaces subject to the abrasion extending from an outer surface of the cylindrical body effective to stabilize the string of drill pipe in a well bore, and a layer of the hardfacing alloy of claim 1 welded to the outer surfaces of the stabilizer ribs subject to the abrasion.

6. A method of prolonging the life of an industrial product subject to abrasion of the order of silicious materials comprising, welding a layer of the hardfacing alloy of claim 1 to one or more surfaces of the industrial product subject to the abrasion.

7. A method of prolonging the life of an industrial product having one or more components with surfaces subjected to abrasive wear of the order of silicious particles comprising, preheating the one or more components, welding to the surface of the one or more components a layer of a hardfacing alloy consisting of about 0.65 to about 1.1 percent carbon, about 4.5 to about 10.5 percent chromium, about 0.05 to about 1.0 percent molybdenum, and the balance iron, including impurities as trace elements, the alloy having a hardness of from about 48 Rc (455 BHN) to about 52 Rc (512 BHN), cooling down the one or more components to which the layer of hardfacing alloy has been welded, the preheating and cooling down effective to structurally transform Austenite to Martensite thereby providing a hardfaced surface to the one or more components free of cracks.

8. The method of claim 7 where, the industrial product surfaces subjected to abrasive wear are selected from the group consisting of box and pin members of drill pipe tool joints and stabilizers.

9. A method of prolonging the life of a tool joint connecting together drill pipe, the tool joint having a connectable threaded box having an outer cylindrical portion and an inner connecting pin and an outer cylindrical portion adjacent thereto, comprising, preheating at least one of the outer cylindrical portion of the box or of the pin or both to a temperature of about 100° C. to about 400° C., welding a layer of abrasive resistant hardfacing alloy to the outer cylindrical portion of one or both of the box and pin while at the preheating temperature of about 100° C. to about 400°, the hardfacing alloy consisting of about 0.65 to about 1.1 percent carbon, about 4.5 to about 10.5 percent chromium, about 0.05 to about 1.0 percent molybdenum, and the balance iron, including impurities as trace elements, the alloy having a hardness of from about 48 Rc (455 BHN) to about 52 Rc (512 BHN), and cooling down the outer cylindrical portion to which the layer of hardfacing alloy has been welded to one or both of the box or pin effective to structurally transform Austenite to Martensite in the layer of hardfacing alloy thereby providing a hardfaced surface resistant to abrasive wear of silicious materials.

10. The method of claim 9 where the threaded box has a diameter greater than the drill pipe and a recessed portion in the outer cylindrical box, comprising welding the layer of hardfacing alloy to the recessed portion in the outer cylindrical portion substantially along its length and substantially flush with the outer surface of the threaded box.

11. The method of claim 9 where the threaded pin has a diameter greater than the drill pipe and a recessed portion in the outer cylindrical portion of the pin, comprising welding the layer of hardfacing alloy to the recessed portion in the outer cylindrical portion substantially along its length and substantially flush with the outer surface of the threaded box.

12. The method of claim 6 where, the welding of the layer of the hardfacing alloy of claim 1 is by open arc, gas-shielded or submerged arc tubular wire.

* * * * *